(12) United States Patent
Nakamura et al.

(10) Patent No.: US 7,085,823 B2
(45) Date of Patent: Aug. 1, 2006

(54) NETWORK ELEMENT MANAGEMENT METHOD, APPARATUS, AND NETWORK MANAGEMENT SYSTEM

(75) Inventors: Toshihiro Nakamura, Kawasaki (JP); Hiroyuki Oguro, Kawasaki (JP); Noriyuki Yokoshi, Kawasaki (JP); Masaki Hayashi, Yokohama (JP); Yoshinobu Yanokura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 762 days.

(21) Appl. No.: 10/105,494

(22) Filed: Mar. 25, 2002

(65) Prior Publication Data

US 2003/0084129 A1    May 1, 2003

(30) Foreign Application Priority Data

Oct. 31, 2001    (JP)    .............................. 2001-335481

(51) Int. Cl.
*G06F 15/177*    (2006.01)
(52) U.S. Cl. ...................... 709/220; 709/221; 709/222; 710/300; 710/301; 710/302; 710/303; 710/304
(58) Field of Classification Search ........ 710/300–304; 709/202, 220–222
See application file for complete search history.

(56) References Cited

U.S. PATENT DOCUMENTS

| | | | |
|---|---|---|---|
| 6,105,089 A * | 8/2000 | Chari et al. .................. | 710/302 |
| 6,134,614 A * | 10/2000 | Chari et al. .................. | 710/302 |
| 6,134,615 A * | 10/2000 | Chari et al. .................. | 710/302 |
| 6,269,417 B1 * | 7/2001 | Mahalingam ............... | 710/104 |
| 6,304,929 B1 * | 10/2001 | Wallach et al. ............. | 710/302 |
| 6,711,645 B1 * | 3/2004 | Chari et al. .................. | 710/302 |
| 6,754,747 B1 * | 6/2004 | Locklear et al. ............ | 710/100 |

FOREIGN PATENT DOCUMENTS

JP    59-178034    10/1984

(Continued)

OTHER PUBLICATIONS

Kenneth R. Sites, et al. An Asynchronous 20-Channel Digital Multiplexer/Demultiplexer System for Transmission on a Single 10 Kilometer Fiber-Optic Link, Proceedings of the 34th International Instrumentation Symposium, vol. 34, 1988 pp. 97-109.

*Primary Examiner*—Ario Etienne
*Assistant Examiner*—Ciara Martin
(74) *Attorney, Agent, or Firm*—Katten Muchin Rosenman LLP

(57)    ABSTRACT

In a network element management method and apparatus, and a network management system where mounting positions of physical components on a network element are unfixed, an external input mounting schedule for a physical component detachable from a network element as mounting plan information including a type of the physical component, a scheduled mounting position within the network element, and a scheduled mounting term is received through a graphical user interface. No overlap with a preliminarily provided mounting schedule for another physical component per each predetermined measure of the scheduled mounting position is confirmed based on the inputted mounting plan information. The mounting plan information is determined to be implementable only when all of the predetermined measures of the scheduled mounting position are confirmed. Information of a holder class instance already generated in association with all of the predetermined measures of the scheduled mounting position is changed only when the mounting schedule is implementable, and a physical class instance associated with the holder class instance is generated.

20 Claims, 17 Drawing Sheets

FOREIGN PATENT DOCUMENTS

| | | |
|---|---|---|
| JP | 01046336 | 2/1989 |
| JP | 5-344091 | 12/1993 |
| JP | 6-22287 | 1/1994 |
| JP | 07050648 | 2/1995 |

* cited by examiner

ALLOCATED AREA (WITH UNIT MOUNTING SCHEDULE)

BLANK AREA (WITHOUT UNIT MOUNTING SCHEDULE)

ALLOCATED AREA (WITH UNIT MOUNTING SCHEDULE)

FIG.3

| NO. | ITEM | MAIN FEATURE |
|---|---|---|
| 1 | MANAGEMENT NE TYPE | ATM-ADM, VIDEO-MUX (ATM-U, VIDEO-U), CODEC |
| 2 | OPERATION SYSTEM | UNIX SERVER 1 SET 24-HOUR OPERATION |
| 3 | MAXIMUM NE REGISTRATION NUMBER | 100NE/DOMAIN |
| 4 | SIMULTANEOUSLY CONNECTABLE CENTER TERMINAL NUMBER | |
| 5 | COMMUNICATION PROTOCOL WITH NE | S-INTERFACE |
| 6 | COMMUNICATION PROTOCOL WITH NMS, SMS, & CENTER TERMINAL | IDL (CORBA) |

MO:Management Object

RDBMS:Relational DataBase Management System

FIG.9A

| PITCH MANAGER TABLE | | | |
|---|---|---|---|
| PARAMETER / PITCH NO. | SCHEDULED DATE FOR MOUNTING | SCHEDULED DATE FOR REMOVAL | MANAGEMENT ID |
| ... | ... | ... | ... |
| 1 | 2000/11/2 | 2000/11/10 | 3 |
| 2 | 2000/11/2 | 2000/11/10 | 3 |
| 3 | 2000/11/2 | 2000/11/10 | 3 |
| 4 | 2000/11/2 | 2000/11/9 | 4 |
| 5 | 2000/11/2 | 2000/11/9 | 4 |
| ... | ... | ... | ... |
| 23 | 2000/11/4 | 2000/11/15 | 9 |
| ... | ... | ... | ... |
| 31 | 2000/11/4 | 2000/11/15 | 9 |

| UNIT HOLDER TABLE | | |
|---|---|---|
| PARAMETER / PITCH NO. | STATE 1 (CURRENT SETTING) | STATE 2 |
| 1 | enabled | enabled |
| 2 | enabled | enabled |
| 3 | enabled | enabled |
| 4 | disabled | enabled |
| 5 | disabled | enabled |
| ... | ... | ... |
| 23 | enabled | enabled |
| ... | ... | ... |
| 31 | enabled | enabled |

| UNIT TABLE | | | | |
|---|---|---|---|---|
| PARAMETER / SERIAL NUMBER | UNIT TYPE | UNIT WIDTH | PITCH STARTING POSITION | ...... |
| 1 | A | 8 | 1 | ...... |
| 2 | B | 9 | 9 | ...... |
| 3 | C | 3 | 1 | ...... |
| 4 | D | 2 | 4 | ...... |
| 5 | B | 9 | 6 | ...... |
| 6 | C | 3 | 7 | ...... |
| 7 | D | 2 | 1 | ...... |
| 8 | D | 2 | 3 | ...... |
| 9 | B | 9 | 23 | ...... |

☆

FIG.17
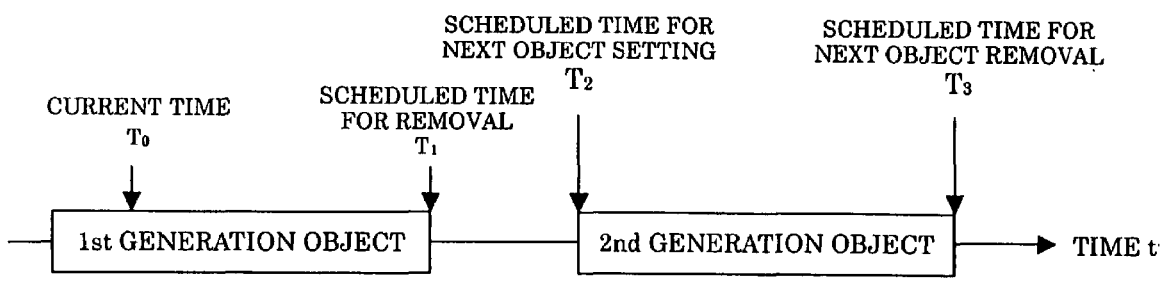
FIG.18
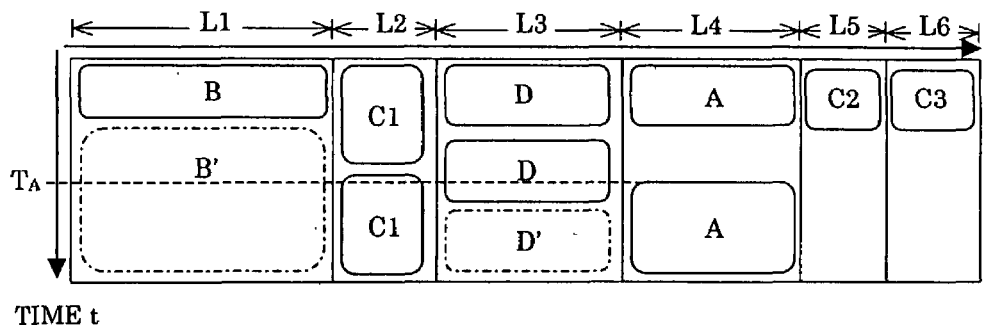
 ALLOCATED AREA (WITH UNIT MOUNTING SCHEDULE)
 BLANK AREA (WITHOUT UNIT MOUNTING SCHEDULE)

NETWORK ELEMENT MANAGEMENT METHOD, APPARATUS, AND NETWORK MANAGEMENT SYSTEM

BACKGROUND OF THE INVENTION

1. Field of the Invention

The present invention relates to a network element management method, a network element management apparatus, and a network management system, and in particular to a method, an apparatus, and a system for managing a network element where mounting positions on physical components of a network element are unfixed.

2. Description of the Related Art

Generally, network management with respect to design, maintenance, operation, and the like of a network is performed hierarchically based on a telecommunication management network (TMN) having a concept for performing advanced network management.

Management layers in the telecommunication management network TMN can be classified as shown in FIG. 13A into following layers: a service management layer SML for managing a service for customers, a network management layer NML for managing an entire network, and an element management layer EML for managing network elements as physical communication devices.

Therefore, in a general network management system, a customer service manager SMS, a network manager NMS and an element manager (or subnetwork manager) EMS shown in FIG. 13B are respectively associated with the management layers SML, NML, and EML of FIG. 13A.

FIG. 14 shows an overall arrangement of such a general network management system. A center 10 of a carrier providing a network and a terminal station 30 as well as a customer of the carrier such as a broadcasting station 20 are connected through networks DCN1 and DCN2 as shown.

In the center 10, an SM server 12, an NM server 11, and an EM server 14 are connected as shown, and respectively provide the functions of the above-mentioned customer service manager SMS, the network manager NMS, and the element manager EMS.

In the following description, the SM server 12, the NM server 11, and the EM server 14 are respectively associated with the provided functions, and are occasionally referred to as an EMS 12, an NMS 11, and an EMS 14.

However, the physical servers need not necessarily correspond one-to-one with the functions. Specifically, the element manager EMS connected to the network elements (including transmission devices) can be distributed in function not only to the physical EM server 14 but also to a plurality of physical servers.

Also, an accessory server group 13 and a center terminal 15 are connected thereto. It is to be noted that the center terminal 15 can access all of the servers.

The SM server 12 in the center 10 is connected to the network DCN1 through a router R1, and the network DCN1 is further connected to an ECC terminal 23 in the broadcasting station 20 through a router R3.

Also, the EM server 14 in the center 10 is connected to the network DCN2 through a router R2, and the network DCN2 is further connected to network elements NE21 and NE22 in the broadcasting station 20 through a router R4, and to network elements NE31 and NE32 in the terminal station 30 through a router R5.

The element manager EMS in such a network management system manages physical components of the network element such as bays, units, and cards.

A plurality of units can be mounted on a single bay, and a plurality of cards can be mounted on a single unit. Hereinafter, this will be described referring to FIGS. 15 and 16.

FIG. 15 shows a bay-unit correspondence where a plurality of units A, B, and C1–C3 are mounted on a bay Y. The units A, B, and C1–C3 are devices of different operation purposes, each of which having an individual physical size (height).

FIG. 16 shows a unit-card correspondence where a plurality of cards P1–P6 are mounted on a unit A. Among the cards P1–P6 inserted into slots (not shown) of the unit A, there are single-slot-width cards occupying a width of one slot such as the cards P1, P2, and P6, as well as double-slot-width cards occupying a width of two slots such as the cards P3–P5.

The element manager EMS of a conventional network management system assumes that the units and the cards actually exist as the physical components of the network element, so that operations for controlling such actually existing units and cards have been the mainstream.

Also, equipment type (system) design information such as an installation schedule of a network element has been controlled by a different design management system, so that processing of unit setup and card setup on the network management system have been executed when actual setup operations are necessitated based on the design information.

Therefore, the element manager EMS has not been required to manage design information such as physical setup positions and types of the individual network elements over the multiple generations.

On the other hand, the conventional network management system has been able to design network specific information such as transmission rates over the multiple generation. Also, in order to provide an efficient customer service manager in a network management system, there is a growing need for preplanning the installation schedule of equipment and the network design in the network management system based on a future contract with an end user. For this purpose, the element manager is required to realize the equipment kind design function.

The subjects of the equipment kind design function are the physical components of the network element managed by the element manager.

In order to realize the equipment kind design function, the element manager of the network management system is required to manage over the multiple generations the design information such as a removal schedule of a network element mounted at present and mounting schedule of a network element to be mounted next. Hereinafter, management of such a design information will be referred to as "generation management".

FIG. 17 schematically shows a conventional generation management of physical components of the element manager. The above-mentioned physical components represent units or cards. Therefore, the first generation object in FIG. 17 represents the physical component at a current time $T_0$, and if the scheduled removal time of the first generation object is $T_1$, the physical component scheduled to be mounted after time $T_1$, e.g. between the times $T_2$ and $T_3$ can be referred to a second generation object.

Conventionally, mounting positions of units on a bay and of cards on a unit have been fixed. Namely, on the bay Y shown in FIG. 15, the units A, B, and C1–C3 are mounted in the order shown. For example, the mounting positions of the units A and B cannot be exchanged up side down. Also, on the unit A shown in FIG. 16, the cards P1–P6 are mounted in the order shown. For example, the mounting positions of the cards P1 and P6 cannot be exchanged from left to right.

FIG. 18 shows a model of the conventional generation management. The horizontal axis shows logical numbers L1–L6 indicating positions in a bay, and the vertical axis shows time "t". Also, areas surrounded by solid lines in FIG. 18 indicate schedules where the units associated with the reference characters A, B, and C1–C3 included in the areas will be set.

Moreover, areas B' and D' surrounded by alternate long and short lines represent terms without schedules for setting the units B and D.

In the generation management shown in FIG. 18, the mounting positions of the units B, C1, D, A, C2, and C3 are fixed on the mounting positions shown respectively by the logical numbers L1–L6. Therefore, the generation management of these logical numbers L1–L6 had only to be performed.

In this case, only the unit B is mounted on the mounting position of e.g. the logical number L1. Therefore, only the management of whether or not the unit B is mounted on the mounting position of the logical number L1 has been required.

Also, since the mounting positions (slots) of the cards to be mounted on the unit have been fixed, the generation management could be performed by the same method as that for mounting units on a bay by allocating logical numbers to the slots of the unit.

In recent years, along with the trend toward use of multiple vendor network elements and commonality of network element backbones, the mainstream of the network element has shifted from the method fixing the positions of the units mounted on the bay and the cards mounted on the unit to a method unfixing the mounting position by using a common specification. Namely, the unit can be mounted on any position of the bay as long as there is an empty space with a size (height) enough for the mounting unit. Also, the card mounted on a unit can be inserted into any slot.

In such a state where it is not required to fix the mounting positions of the units and the cards that are the physical components of the network unit, the conventional generation management method using the logical numbers associated with the mounting positions is inefficient.

Since it has been the mainstream to manage in a state where the physical components are actually mounted, there has been no function for allocating the mounting schedule of the units or the cards that have not yet existed.

In the example of FIG. 18, a case is assumed where mounting of a new unit "i" (not shown) having the same size as the unit A is desired from the time $T_A$ for the same term as the unit A scheduled to be mounted on the mounting position of the logical number L4.

When the conventional generation management method is applied, the logical number L3 that is the mounting position for the unit D has been allocated the same size as the unit A, so that there is a possibility that the unit "i" can be mounted. However, the mounting position of the logical number L3 has the unit D mounted at the time $T_A$. Therefore, the unit "i" cannot be mounted on the mounting position of the logical number L3 for the desired term.

As for the logical number L1, that is the mounting position for the unit B, although there is enough time where there is no setup schedule of the unit B as shown by the blank area B', the fixed sizes respectively allocated to the logical numbers L1 and L4 are different from each other, so that it is impossible to mount the unit "i" on the mounting position of the logical number L1.

Thus, when it is possible to flexibly change the mounting positions of the units on the bay, the occupancy of the bay cannot be achieved efficiently enough by the conventional generation management method. This problem is common to the generation management of the cards mounted on the unit.

Moreover, the following problems exist in the management of the cards. The above-mentioned cards P3–P5 in FIG. 16 are the double-slot-width cards. Therefore, the width of the slots being used is physically a width for two slots. However, since only one slot is actually inserted into the backboard, the network element can recognize only one slot.

FIG. 19A shows a part of a unit where a card is installed in a position of slots 1 and 3 within slots 1–8 lined on an upper and a lower row. Meanwhile, FIG. 19B shows information managed on the network management system. Namely, the network element recognizes that only one single-slot-width card is installed in the slot 3 which is actually inserted into the backboard and that a card is not installed in the slot 1.

There has been no problem in particular with the conventional management method fixing the mounting position of the card. However, in case of performing a generation management without fixing the mounting positions of the cards, the element manager EMS is required to recognize that while the double-slot-width card is installed in the slot 3, the slot 1 cannot be used.

Also, in order to realize a redundant structure of the network element, some of the cards depending on the types thereof restrict the mounting of other cards on the adjoining slots.

The element manager EMS is also required to recognize that the adjoining slots cannot be used while such a card disabling the use of the adjoining slots is mounted.

SUMMARY OF THE INVENTION

It is accordingly an aim of the present invention to provide a network element management method, a network element management apparatus, and a network management system, where mounting positions of physical components on a network element are unfixed, which enable a generation management of physical components on a network element with an efficient occupancy, and corresponding to the realities.

In order to achieve the above mentioned aim, using an object orientation to perform a generation management by holding date information per unit and card, namely, by holding the date information as attributes of a unit class and a card class can be considered.

In this case, for example, a unit instance generated by the unit class collectively holds a size of a subject unit, and a mounting position, as well as date information such as a scheduled installation date and a scheduled removal date.

Therefore, when newly generating a unit instance, it is required to confirm that there is no overlap with mounting positions and mounting terms of all of the existing unit instances in the same bay.

When trying to perform the generation management over multiple generations, since retrieval processings required for such confirmations is estimated to assume an enormous number, the generation management in a form where date information attributes are held per unit class and card class is considered inappropriate.

Therefore, the network element management method according to the present invention comprises: a mounting schedule input step for receiving as an external input mounting schedule for a physical component detachable from a network element as mounting plan information including a type of the physical component, a scheduled mounting position within the network element, and a scheduled mounting term through a graphical user interface; a determination step for confirming that there is no overlap with a preliminarily provided mounting schedule for another physical component per each predetermined measure (unit of measurement) of the scheduled mounting position based on the inputted mounting plan information, and for determining that the mounting plan information is implementable only when all of the predetermined measures of the scheduled mounting position are confirmed; a first instance processing step for changing information of a holder class instance already generated in association with all of the predetermined measures of the scheduled mounting position only when the mounting schedule is implementable; and a second instance processing step for generating a physical class instance associated with the holder class instance. (claim 1)

FIGS. 1A and 1B are diagrams illustrating a principle of a network element management method according to the present invention, in which states of mounting schedules are schematically shown, with units taken as examples of the physical components detachable from a bay of a network element. FIG. 1A shows mounting schedules of units A, B, C1–C3, and D with the horizontal axis showing the pitch number of the bay and the vertical axis showing the time. Also, holder class instances I_1–I_31 associated with pitch numbers 1–31 are prepared in FIG. 1A.

Allocated areas surrounded by solid lines in FIG. 1A are the same as those shown in FIG. 18 indicating that the mounting schedules have been implemented (unit mounting schedules exist) for the units corresponding to the reference characters included within the areas. FIG. 1A is different from FIG. 18 in that the mounting positions of the units are unfixed.

In the state shown in FIG. 1A, when preparing a mounting schedule for mounting a new unit identical to the unit B on a blank area BLANK shown at a mounting position of the pitch numbers 23–31, firstly at a mounting schedule input step, a type of a physical component to be mounted, a scheduled mounting position within the network element, and a scheduled mounting term are inputted as mounting plan information by a maintenance person through a graphical user interface (GUI).

It is determined at a determination step whether or not the inputted mounting plan information is implementable by confirming, per each predetermined measure of the scheduled mounting position, that there is no overlap with the mounting schedule of other physical component whose mounting schedule is already prepared, so that the mounting plan information is determined to be implementable only when all of the predetermined measures are confirmed.

In the example of FIG. 1, during the term corresponding to the blank area BLANK, there is no overlap with mounting schedules of other units for the corresponding scheduled mounting positions (pitch numbers 23–31), so that it is determined that the mounting plan information of the unit identical to the unit B is implementable.

Only when it is determined that the mounting plan is implementable at the above-mentioned determination step, the first instance processing step changes the information of the instances I_23–I_31 associated with all of the predetermined measures in the scheduled mounting positions within the holder class instances I_1–I_31 already generated. Also, the second instance processing step generates a physical class instance associated with the holder class instances.

Therefore, as shown in FIG. 1B, for each of the pitch numbers 23–31, the holder class instances I_23–I_31 already generated are changed to include contents of information shown by reference characters I_23'–I_31' in FIG. 1B corresponding to the mounting plan of the newly mounting unit identical to the unit B. Also, a physical instance I_B associated with the holder class instances I_23–I_31 is generated.

Thus, a holder class is for allocating instances associated with the mounting plan of the physical components per each predetermined measure such as pitch unit. Also, a physical class is for generating an instance associated with the mounting schedule per each physical component.

Therefore, different from the conventional generation management model diagram shown in FIG. 19, it is made possible to perform a generation management with an efficient occupancy of the units whose mounting positions are unfixed.

In this case, only the instances generated per pitch unit by the pitch numbers associated with the scheduled mounting position need to be confirmed at the above-mentioned determination step. Therefore, retrieval processings can be reduced compared to the generation management method where date information is held per unit so that all of the units whose mounting schedules are already implemented need to be confirmed.

In the above-mentioned network element management method, when the physical component comprises a unit mountable on a bay of the network element, the holder class may comprise a unit holder class for managing a pitch of the bay as the predetermined measure. (claim 2)

Namely, when the physical component is a unit mounted on a bay of a network element, a pitch may be used as the predetermined measure as shown in FIGS. 1A and 1B, and a unit holder class for managing the pitches may be used as a holder class.

Thus, it is made possible to perform the generation management of the units whose mounting positions on the bay are unfixed.

Also, in the above mentioned network element management method, when the physical component comprises a card mountable on a unit, the holder class may comprise a card holder class for managing a slot of the unit as the predetermined measure. (claim 3)

Namely, when the physical component is a card mounted on a unit, the pitch numbers in FIGS. 1A and 1B may be replaced by slot numbers, a slot may be used as the predetermined measure, and a card holder class for managing the slots may be used as a holder class.

Thus, it is made possible to perform the generation management of the cards whose mounting positions on the unit are unfixed.

Also, in the above-mentioned network element management method the physical component may comprise a virtual object whose size is expressed by the predetermined measure. (claim 4)

Namely, the physical component scheduled to be mounted on the network element need not necessarily be an existing unit or card, but may be a virtual object whose size is expressed by the predetermined measure.

Accordingly, it is made possible to manage as if there is a mounting schedule for a virtual object in such a portion of a double-slot-width card that is not mounted on a slot (portion where the slot width is only occupied), or an unusable slot in case a card disabling the use of the adjoining slots is mounted.

Also, even though a specific physical component is not determined, if there is a mounting schedule of a physical component in the future, it is made possible to reserve the scheduled mounting position and the scheduled mounting term.

In this case, the above-mentioned network element management method may further comprise a third instance processing step for generating a blank area class instance, as a substitute for the physical class instance, associated with the virtual object. (claim 5)

Namely, by distinguishing the virtual object from the existing physical component to be managed with a blank area class, the third instance processing step can generate a blank area class instance apart from the physical class instance.

Also, a network element management apparatus according to the present invention comprises: a graphical user interface for receiving as an external input mounting schedule for a physical component detachable from a network element as mounting plan information including a type of the physical component, a scheduled mounting position within the network element, and a scheduled mounting term; determination means for confirming that there is no overlap with a preliminarily provided mounting schedule for another physical component per each predetermined measure of the scheduled mounting position based on the inputted mounting plan information, and for determining that the mounting plan information is implementable only when all of the predetermined measures of the scheduled mounting position are confirmed; first instance processing means for changing information of a holder class instance already generated in association with all of the predetermined measures of the scheduled mounting position only when the mounting schedule is implementable; and second instance processing means for generating a physical class instance associated with the holder class instance. (claim 6)

In the above-mentioned network element management apparatus, when the physical component comprises a unit mountable on a bay of the network element, the holder class may comprise a unit holder class for managing a pitch of the bay as the predetermined measure. (claim 7)

Also in the above-mentioned network element management apparatus, when the physical component comprises a card mountable on a unit, the holder class may comprise a card holder class for managing a slot of the unit as the predetermined measure. (claim 8)

Moreover, in the above-mentioned network element management apparatus, the physical component may comprise a virtual object measured in terms of the predetermined measure. (claim 9) In this case, the above-mentioned network element management apparatus may further comprise third instance processing means for generating a blank area class instance, as a substitute for the physical class instance, associated with the virtual object. (claim 10)

Also a network management system according to the present invention comprises: an element management server for managing network elements by utilizing any one of the above mentioned network element management methods according to the present invention; a network management server for managing a network layer; and a service management server for managing a service for customers. (claim 11)

Namely, in a network management system according to the present invention, an element management server manages the network elements by utilizing the network element management methods according to the present invention, a network management server manages an entire network, and a service management server manages a service for customers respectively in the element management layer, the network management layer, and the service management layer, that are layers of the telecommunication management network.

In this case, the element management server may perform setting required for mounting the physical component by using the holder class instance and the physical class instance according to the mounting schedule of the physical component. (claim 12)

Namely, when performing a setting required for mounting the physical component whose mounting schedule is implemented, the above-mentioned element management server can use the holder class instance and the physical class instance generated by the preliminarily inputted mounting plan information.

BRIEF DESCRIPTION OF THE DRAWINGS

FIG. 3 is a table showing examples of main features of an element manager EMS in an embodiment of the present invention;

FIGS. 9A and 9B are diagrams showing management table examples in terms of a pitch in an embodiment of the present invention;

FIG. 10 is a diagram showing a unit table example in an embodiment of the present invention;

FIG. 17 is a diagram illustrating a concept of a conventional generation management;

FIG. 18 is a block diagram illustrating a model of a conventional generation management.

Throughout the figures, like reference numerals indicate like or corresponding components.

DESCRIPTION OF THE EMBODIMENTS

Figure 2:
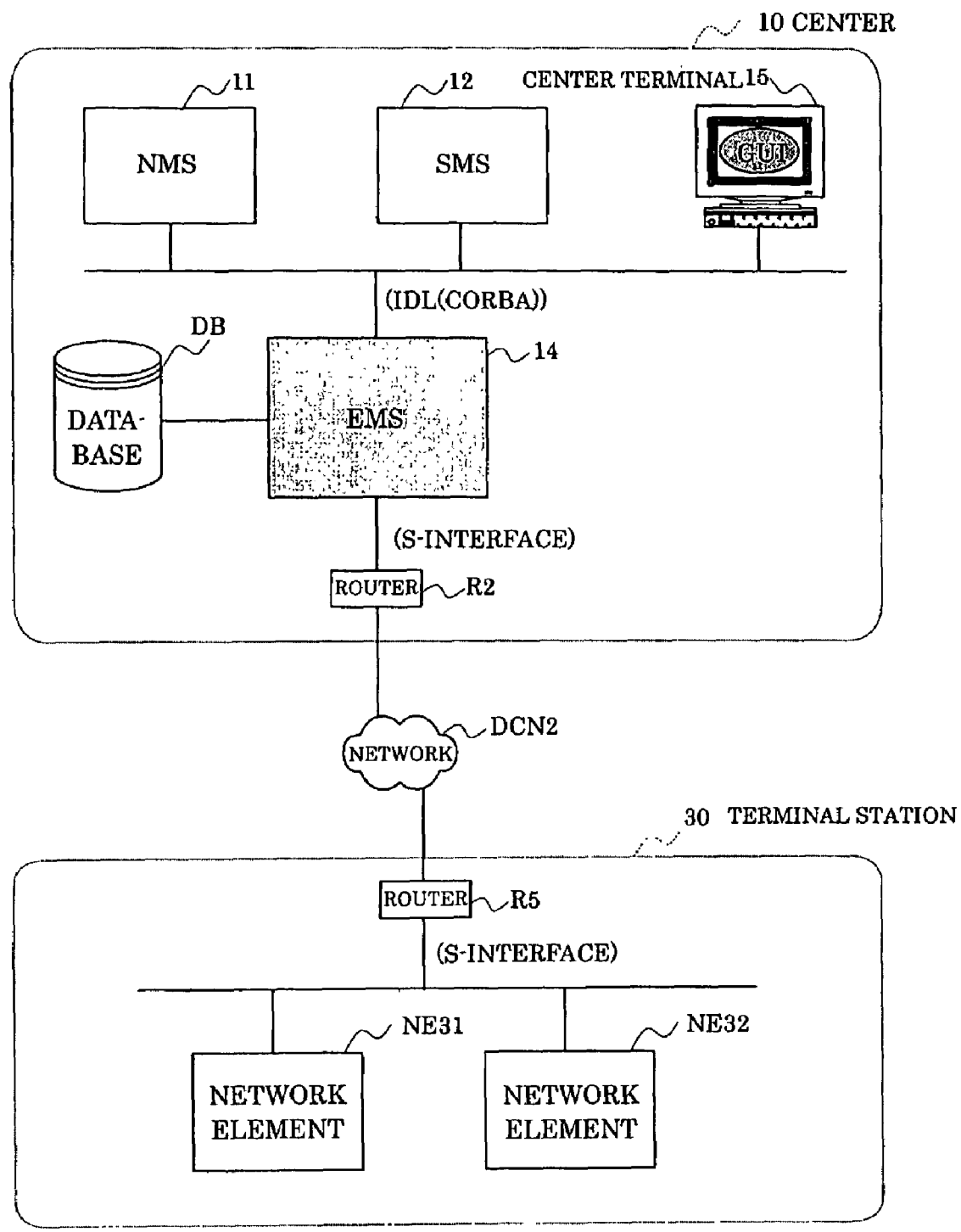
FIG. 2 is a block diagram showing a connection overview centering an element manager EMS in an embodiment of the present invention.
Figure 14:
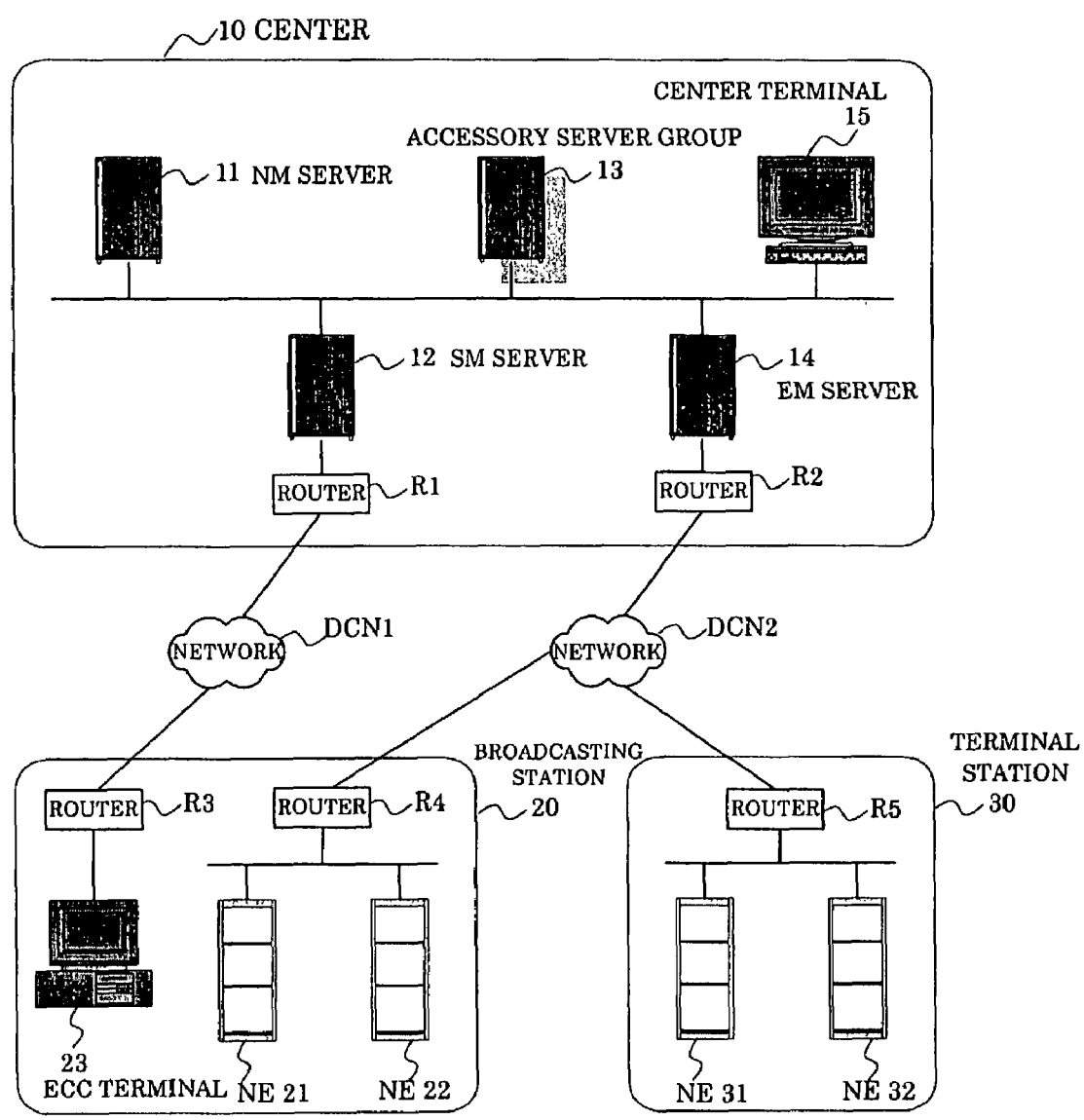
FIG. 14 is a block diagram showing an overall arrangement of a general network management system.

In order to describe an embodiment of the present invention, FIG. 2 shows a connection overview centering the element manager EMS of the general network management system shown in FIG. 14.

Since FIG. 2 shows only components related to the element manager EMS14 excerpted from the overall arrangement shown in FIG. 14, the accessory server group 13 in FIG. 14 is omitted. Also, while only the connection between the center 10 and the terminal station 30 is shown in FIG. 2, by reading the router R5, and the network elements NE31, NE32 respectively as the router R4, and the network elements NE21, NE22, the terminal station 30 can be read as the broadcasting station 20.

Also, in FIG. 2, a database DB is connected to the element manager EMS14 in the center 10. This database DB is for holding various tables referred to by the element manager EMS14.

As shown in FIG. 2, the element manager EMS14 uses an IDL(CORBA) as a communication protocol with the network manager NMS11, the service manager SMS, and the center terminal 15, and an S-interface as a communication protocol with the network elements NE31 and NE32.

It is to be noted that the communication protocols are not limited to the above-mentioned IDL(CORBA) and the S-interface, so that other protocols may be used.

FIG. 3 is a table showing examples of main features of the element manager EMS14 including the above-mentioned communication protocol. As shown in FIG. 3, there are types of managed network element (NE) such as an ATM-ADM, a VIDEO-MUX (ATM-U, VIDEO-U), and a CODEC. Also, an operation system may be one set of a UNIX server operating 24 hours, and a maximum registration number of the network element may be 100 per domain.

Figure 4:
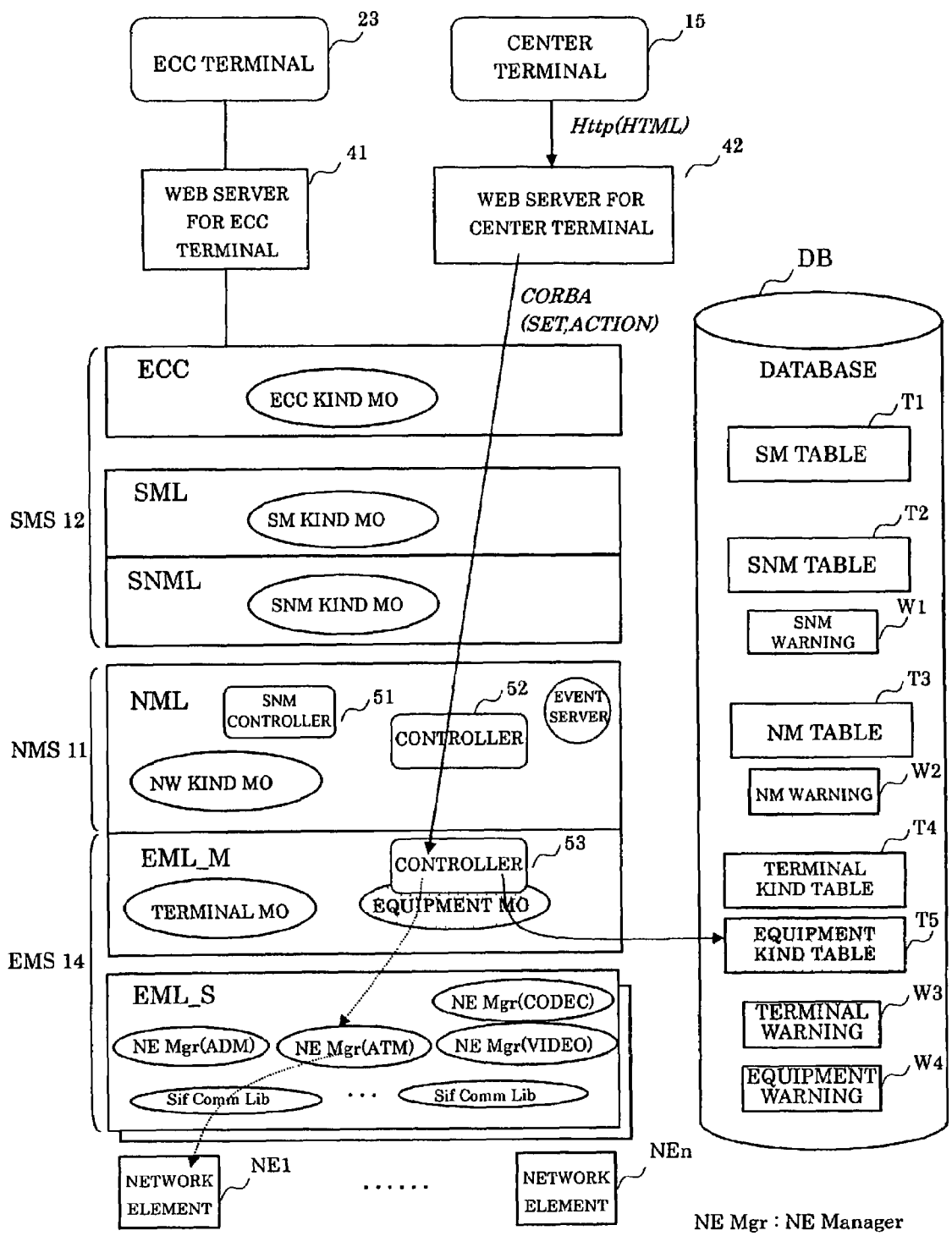
FIG. 4 is a block diagram illustrating a processing flow of an element manager in an embodiment of the present invention.

In order to describe the processing flow of the element manager, FIG. 4 shows an overall arrangement of a network management system using an object-orientation.

The ECC terminal 23 shown in FIG. 4 is accessible to the SM server 12 through a Web server 41 for the ECC terminal, and the center terminal 15 is accessible to the SM server 12, the NM server 11, and the EM server 14 through a Web server 42 for the center terminal.

It is to be noted that the Web server 41 for ECC terminal and the Web server 42 for the center terminal are shown as different servers. This is because in FIG. 14 showing the overall arrangement of the above-mentioned general network management system, the ECC terminal 23 is shown as if connected only to the SM server 12 through the network DCN1. Therefore, the Web server 41 for the ECC terminal and the Web server 42 for the center terminal actually form a single server.

In FIG. 4, the functions of the SMS12, the NMS11, and the EMS14 shown in FIG. 2 are subdivided to be respectively shown by management layers of ECC, SML, SNML, NML, EML_M, and EML_S.

Also, an ECC kind MO, an SM kind MO, an SNM kind MO, an NM kind MO, an equipment MO, and a terminal MO shown to be included in the respective management layers in FIG. 4 represent management objects (MO's), that is a general name of programs for managing objects in the respective management layers.

Also, the controllers control operation sequence of the management objects. The SNM controller 51 as well as the controllers 52 and 53 shown in FIG. 4 take charge of the control.

Moreover, FIG. 4 shows exemplary tables stored in the database DB shown in FIG. 2.

As shown in FIG. 4, a command inputted from the center terminal 15 reaches the controller 53 through the Web server 42 for the center terminal. If this command is an input of a mounting schedule such as a schedule for mounting a unit on a bay, or a card on a unit, the controller 53 updates a predetermined table in an equipment type table T5.

It is to be noted that in case of a "setup" processing command for actually making the unit or the card usable, the controller 53 transmits a setup signal to the corresponding network element (e.g. NE1) through an equipment NE manager (NEManager) that will be described later.

Figure 5:
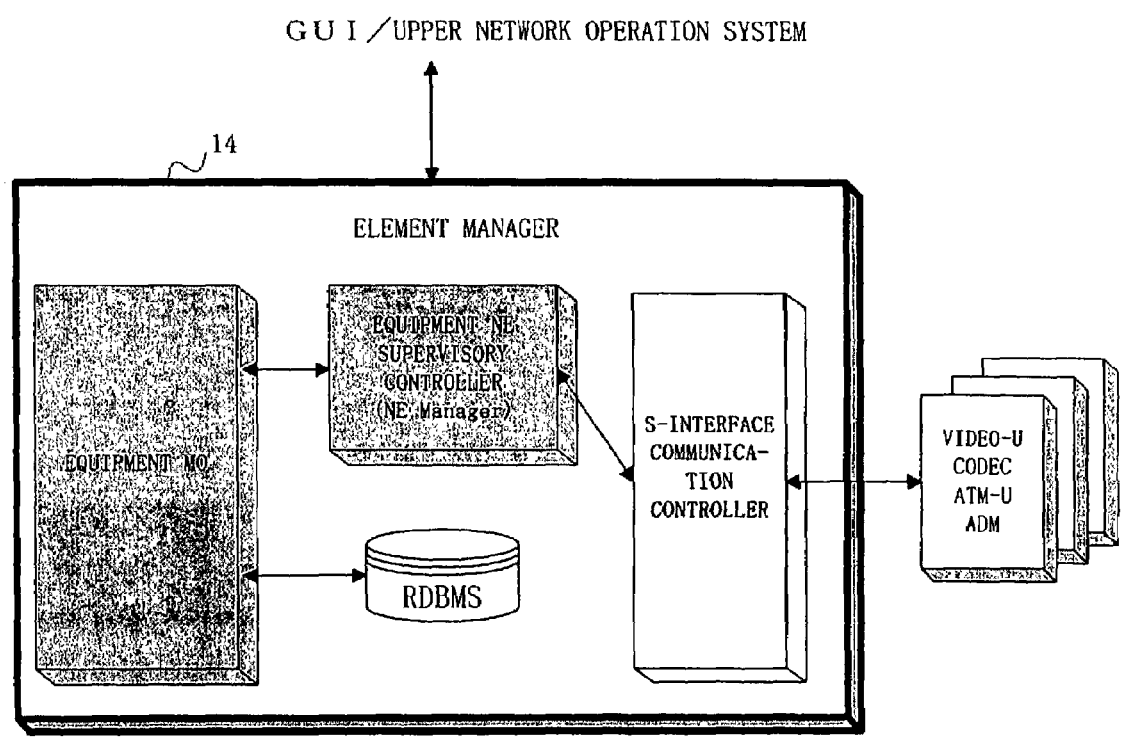
FIG. 5 is a block diagram illustrating a software arrangement in an embodiment of the present invention.

FIG. 5 shows a software arrangement excerpting the equipment type software in the EMS 14 shown in FIG. 4. The software arrangement shown in FIG. 5 can be realized by using Solaris as an OS and C++ as a compiler on a SUN hardware.

It is to be noted that the hardware, the OS, and the compiler other than the above-mentioned ones may be used in combination.

As shown in FIG. 5, according to a request from a graphical user interface (GUI) or an upper network operation system, the element manager EMS14 provides functions (1)–(3) as follows:

(1) Equipment MO

An Equipment MO is a component common to all of the devices performing a control related to device information which should be managed by the element manager EMS.

(2) Equipment NE Manager (NEManager)

An equipment NE manager is a component for performing a special control in a network element and a control of sequence or the like requiring attention.

(3) Relational Database Management System (RDBMS)

An RDBMS is a component for storing information required to be held on the element manager EMS14 among the information managed by the equipment MO.

(4) S-Interface Communication Controller

An S-interface communication controller is a component for controlling an interface with the network elements.

Figure 6:
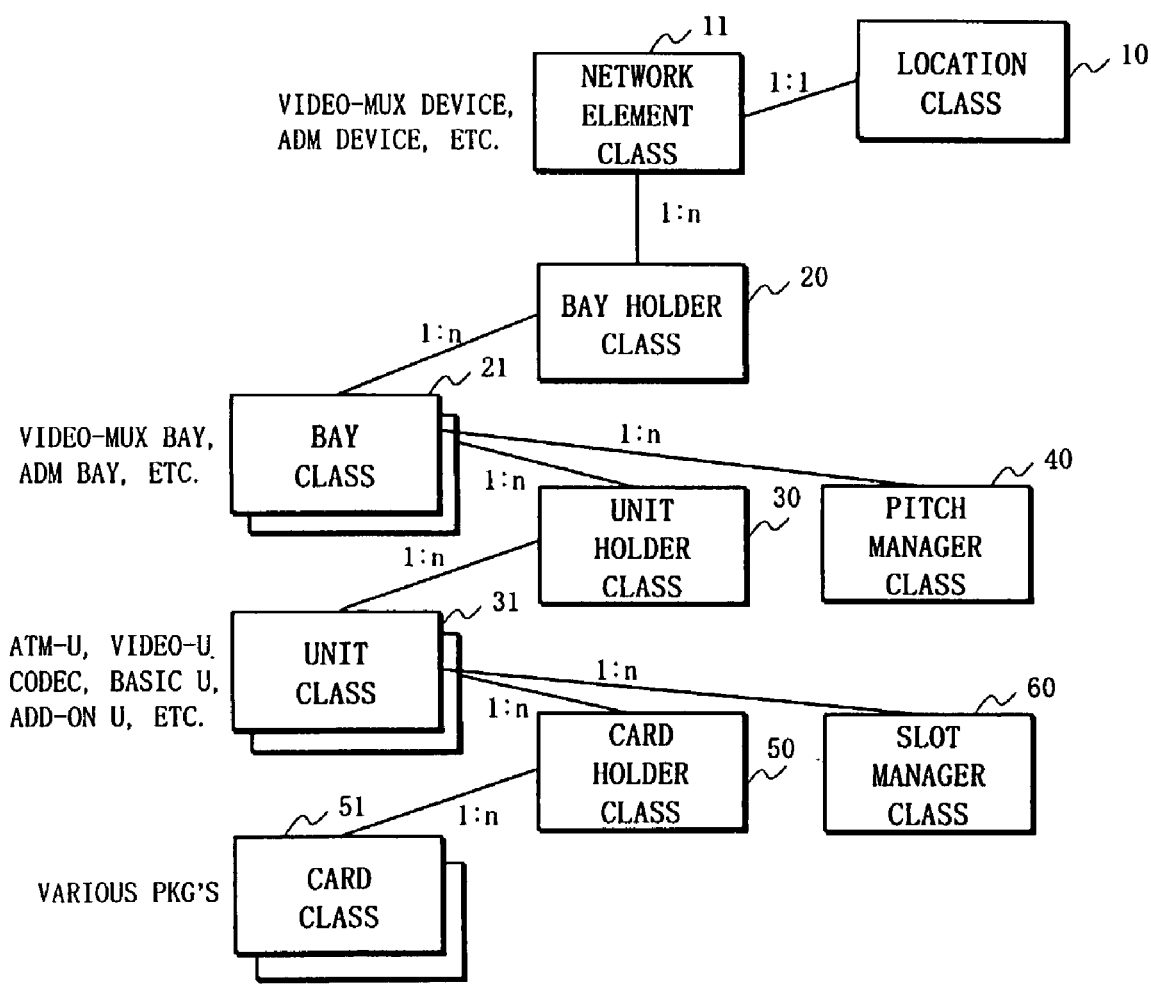
FIG. 6 is a class chart of an equipment class in an embodiment of the present invention.

FIG. 6 shows a class chart representing an equipment class as a subject of management by the element manager.

A location class 10 shown in FIG. 6 is for managing location information such as the broadcasting station 20 and the terminal station 30 shown in FIG. 14.

Also, a network element class 11 is for managing information of the network element such as the VIDEO-MUX device and the ADM device.

Similarly, a bay class 21 manages information of the bay such as a VIDEO-MUX bay and an ADM bay, while a unit class 31 manages information of the unit such as the ATM unit (ATM-U) and the VIDEO unit (VIDEO-U), and a card class 51 manages information of various cards (packages).

In FIG. 6, it is assumed that a plurality of bays form a network element, a plurality of units form a bay, and a plurality of cards form a unit.

Therefore, as shown in FIG. 6, a bay holder class 20, a unit holder class 30, and a card holder class 50 are provided as holder classes for managing mounting positions by predetermined measures when a bay, a unit, and a card are respectively mounted on a network element, a bay, and a unit.

Among these, the unit holder class 30 generates an instance per pitch as the measure of the mounting position of the unit on the bay, and manages pitch information.

Also, the card holder class 50 generates an instance per slot as the measure of the mounting position of the card on the unit, and manages slot information.

Moreover, a pitch manager class 40 and a slot manager class 60 manage life-cycle information of the instances respectively generated by the unit holder class 30 and the card holder class 50.

It is to be noted that FIG. 6 does not show a manager class for managing life-cycle information of instances of the bay holder class 20. However, it is possible to add a manager class for managing the life-cycle information of the instances of the bay holder class 20 in case a management for forming a network element with a plurality of bays is required in actuality.

Figure 7:
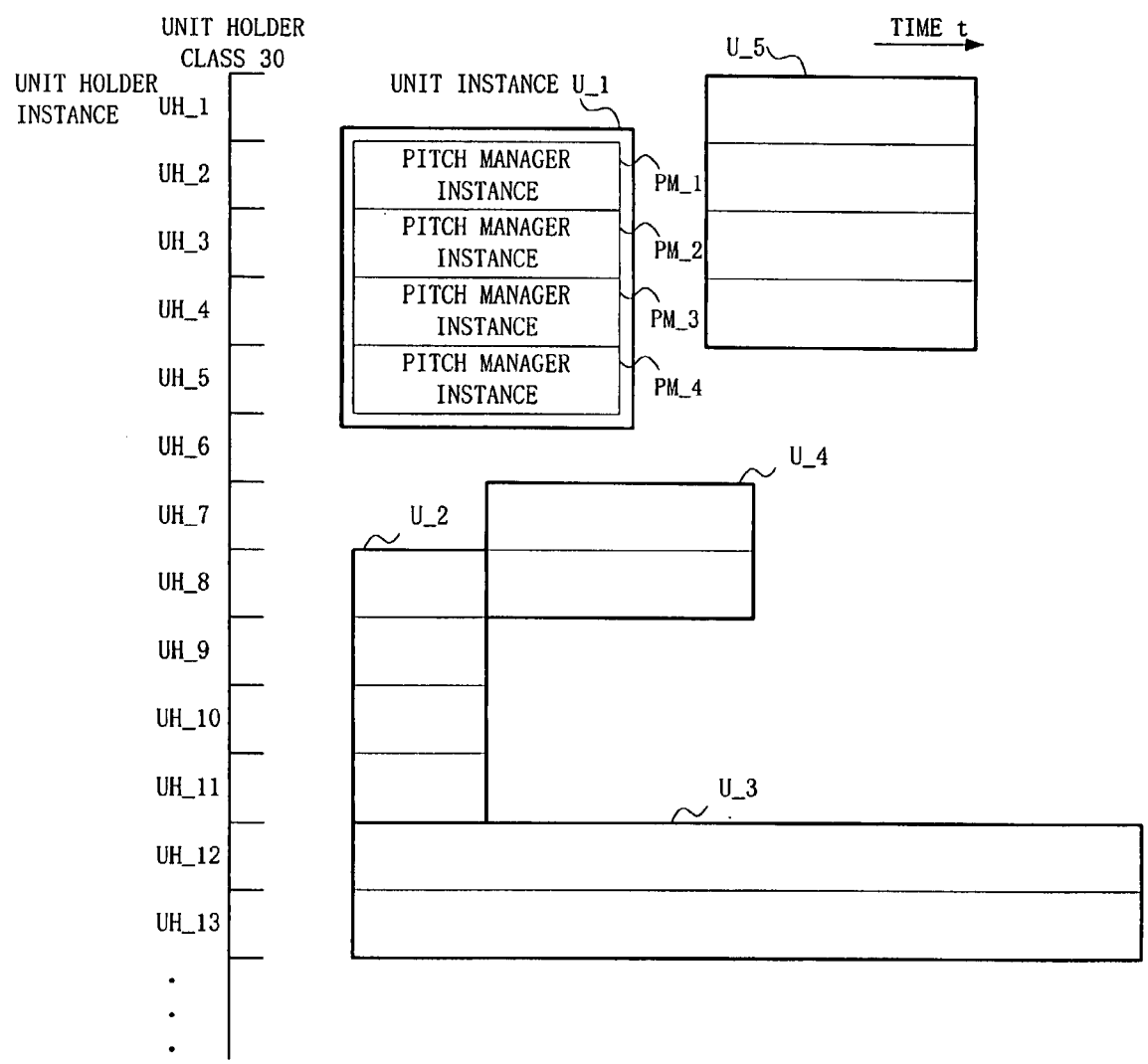
FIG. 7 is a block diagram showing instance generation examples with respect to unit mounting schedules in an embodiment of the present invention.

As an example of instance generation by each of the classes shown in FIG. 6, FIG. 7 shows one with respect to the mounting schedule of a unit on a bay.

In FIG. 7, the horizontal axis shows time "t", and the vertical axis shows unit holder instances UH_1–UH_13 generated by the unit holder class 30.

Also, as the instance of the unit class 31 (see FIG. 6), unit instances U_1–U_5 are generated.

For example, by focusing attention on the unit instance U_1, it is seen that the pitch manager class 40 (see FIG. 6) manages the life-cycle information of the unit holder instances UH_2–UH5 associated with the unit instance U_1 with pitch manager instances PM_1–PM_4.

A processing flow in case an actual mounting schedule of a unit using such a pitch manager class 40, a unit holder class 30, and a unit class 31 will be described referring to FIG. 8.

Figure 1A:
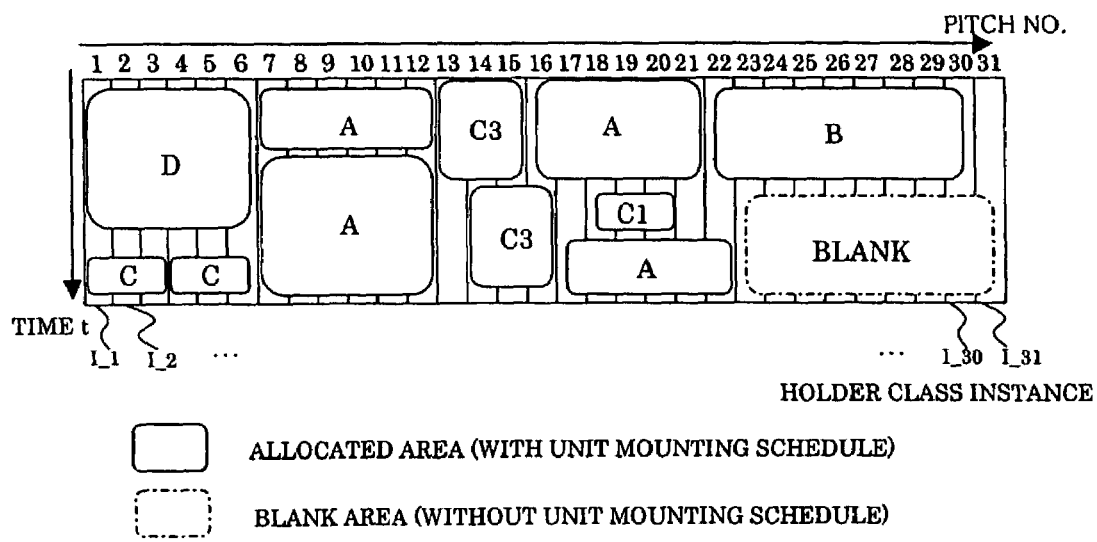
FIG. 1 is a diagram illustrating a principle of the present invention.
Figure 1B:
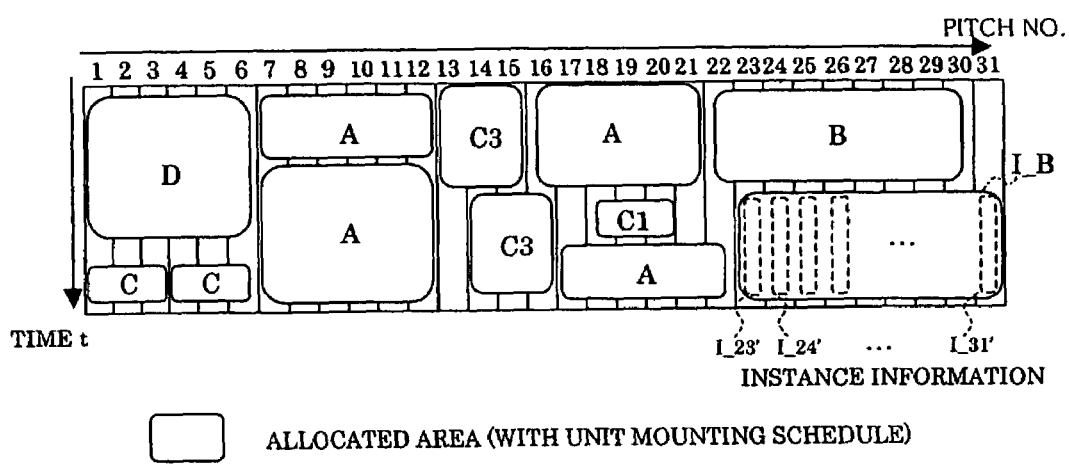

It is to be noted that similar to the description using the above-mentioned FIGS. 1A and 1B, the example of mounting the new unit B on the blank area BLANK of FIG. 1A will be used as an exemplary mounting schedule.

Figure 8:
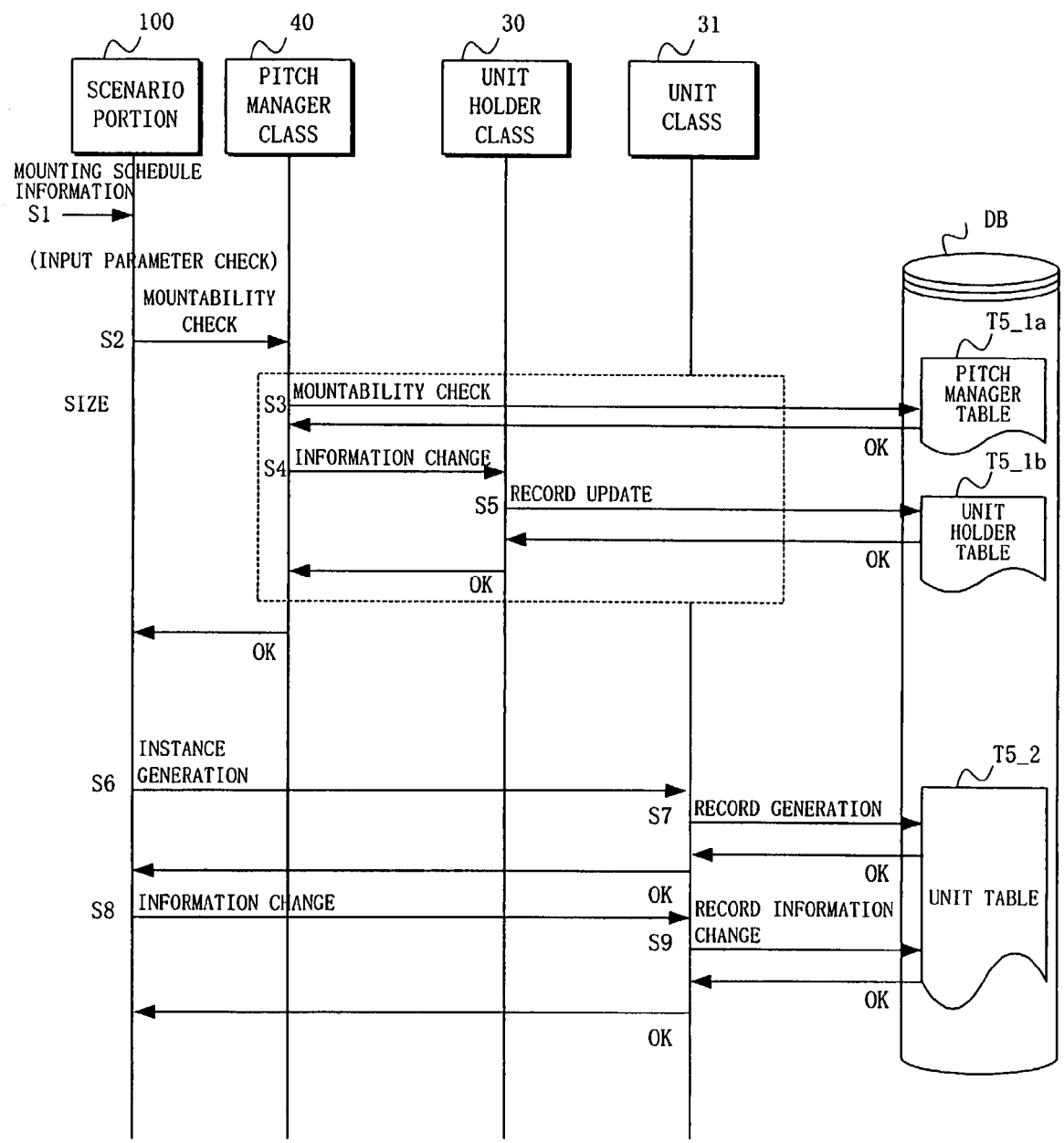
FIG. 8 is a sequence chart showing a processing flow of a new mounting schedule of a unit in an embodiment of the present invention.

A scenario portion 100 in FIG. 8 is included in the equipment MO shown in FIG. 5, and is a program for controlling object based on a scenario depending on the object held by the controller shown in FIG. 5.

Figure 15:
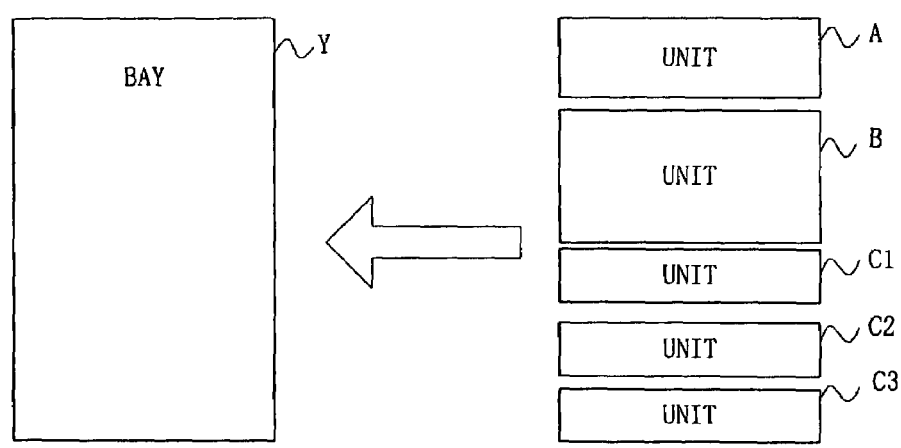
FIG. 15 is a diagram showing a general correspondence between a bay and units.
Figure 16:
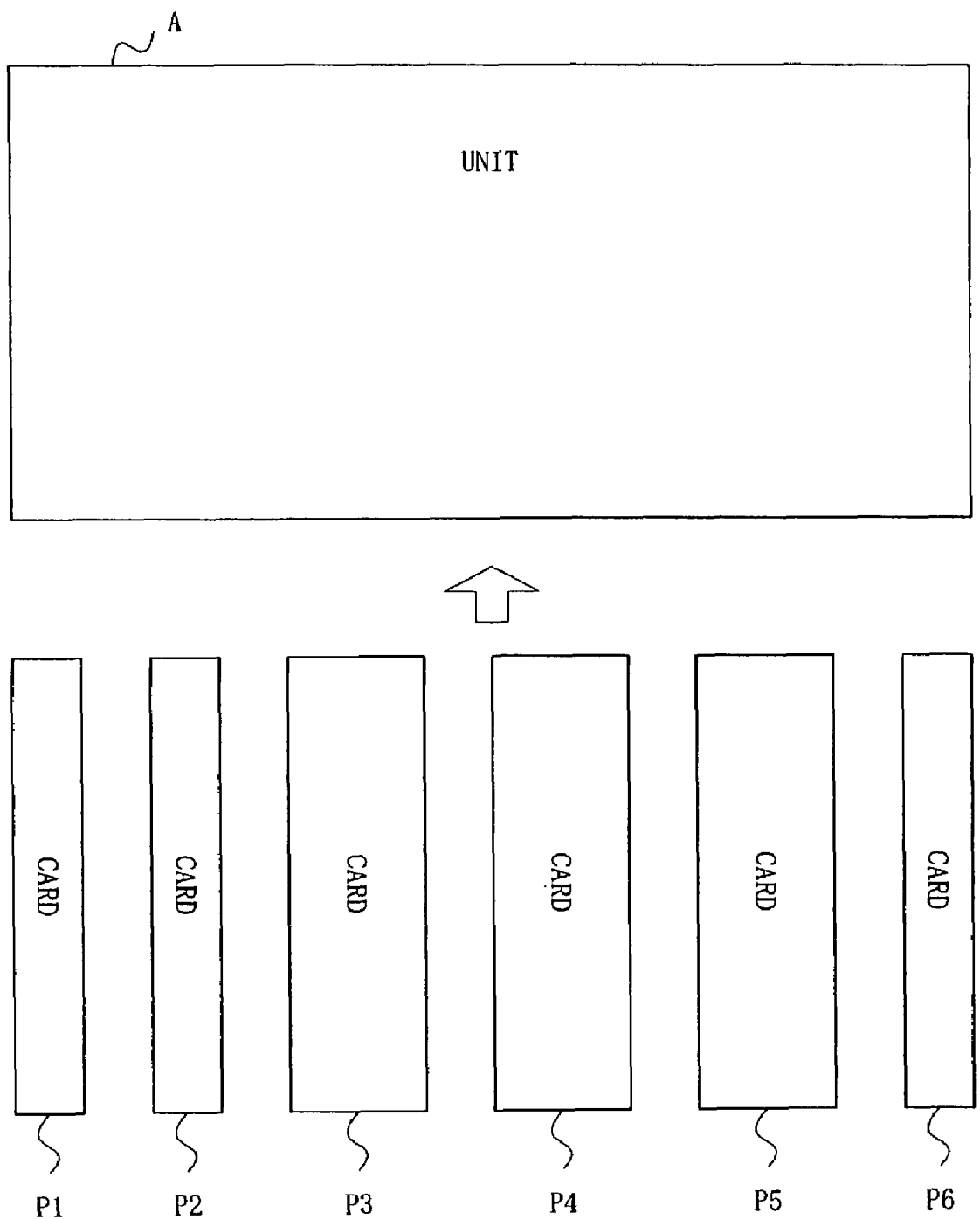
FIG. 16 is a diagram showing a general correspondence between a unit and cards.
Figure 19A:
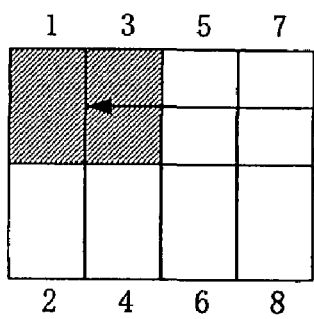
FIGS. 19A and 19B are block diagrams illustrating differences between a conventional card installed state and management information on a system.
Figure 19B:
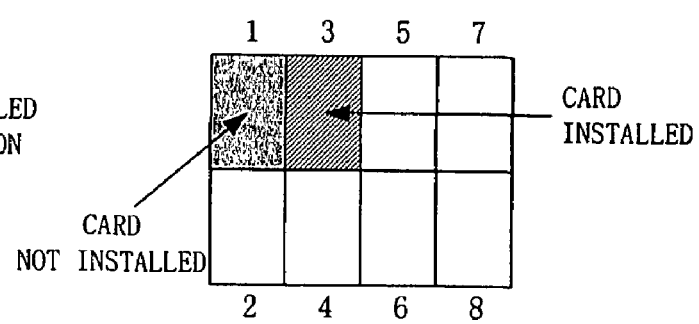

At first, a mounting plan information of a unit externally inputted by an operator through the graphical user interface of the center terminal 15 (see FIGS. 2 and 15) is provided to the scenario portion 100 (at step S1).

The mounting plan information includes a unit size, a scheduled date for mounting, a scheduled date for removal, a unit type, and a scheduled mounting position of the unit, and the like. However, by enhancing the function of the graphical user interface, required manual inputs by the operator can be minimized.

In the example of a new mounting schedule of the unit B in FIGS. 1A and 1B, the size of the unit B is 9 pitches, the scheduled dates for mounting and removal are dates respectively corresponding to the upper edge and the lower edge of the blank area BLANK, the unit type is "unit B", and the scheduled mounting position is associated with the pitch numbers 23–31.

The scenario portion 100 checks input parameters of the inputted mounting plan information, and then requests a mountability check to the pitch manager class 40 (at step S2). The pitch manager class 40 refers to a pitch manager table T5_$_1$a in the database DB to check whether or not there is an overlap within the scheduled mounting term (mountability check at step S3). When mountable (OK), the pitch manager class 40 requests the unit holder class 30 to change the corresponding instance information (at step S4).

It is to be noted that the reply when processing steps are normally executed is indicated by a signal "OK" in FIG. 8.

The unit holder class 30 updates a corresponding record in a unit holder table T5_1b in the database DB (at step S5).

In case of FIG. 1A, there is no mounting schedule information for the unit holder instances I_23–I_31 associated with the pitch numbers 23–31 within the scheduled mounting term corresponding to the blank area BLANK. Namely, the information shown by the reference characters I_23'–I_31' shown in FIG. 1B does not exist in the unit holder instances I_23–I_31 of FIG. 1A.

Therefore, at step S5 of FIG. 8, the unit holder instances I_23–I_31 associated with the pitch numbers 23–31 in FIG. 1B are updated to include the information of reference characters I_23'–I_31' respectively.

In case the result of the mountability check at step S2 in FIG. 8 is "OK", the scenario portion 100 requests the unit class 31 to generate a unit instance (at step S6), and the unit class 31 generates a record in a unit table T5_2 in the database DB (at step S7).

It is to be noted that when generating instances, default values are used so that the scenario portion 100 instructs an information change to the unit class 31 in order to reflect the inputted mounting plan information to the corresponding instances (at step S8). The unit class 31 updates the information of the corresponding record in the unit table T5_2 in the database DB (at step S9).

An exemplary unit instance thus generated is the unit instance I_B shown in FIG. 1B.

While it is possible to generate an instance without using default values, instance generation using default values are performed in this embodiment for simplification and speed-up of the program.

FIGS. 9A and 9B specifically show the pitch manager table T5_1a and the unit holder table T5_1b in FIG. 8. FIG. 10 specifically shows an example of the unit table T5_2.

In the example of the pitch manager table shown in FIG. 9A, a pitch number, a scheduled date for mounting, a scheduled date for removal, and a management ID are shown as parameters of the generated records. The records corresponding to the number of the pitches are added to the pitch manager table every time a new mounting schedule is added.

Therefore, in case of the example shown in FIGS. 1A and 1B, assuming that the term corresponding to the blank area BLANK is from 2000/11/4 to 2000/11/15, the schedule for newly mounting the unit B on the pitch numbers 23–31 is added as records of the pitch numbers 23–31 as indicated by a symbol ☆ in FIG. 9A.

Also, in the example of the unit holder table shown in FIG. 9B, the state "1" (current setting) showing the setting at present and the state "2" which is a schedule of the setting state in the future are shown as parameters.

It is to be noted that the parameters of states 3-n (not shown) as future setting states can be added, thereby enabling multiple generation management.

In FIG. 9B, the values of the parameters are "enabled" and "disabled". These parameters respectively indicate "already set" and "not yet set" in the state "1" that is the current setting state. However, they respectively indicate "with setting schedule" and "without setting schedule" in the state "2" that is the future schedule. It is to be noted that "already set" means that not only the unit is placed on the predetermined position but also the setup processing for making the unit usable have been already completed.

In the unit holder table shown in FIG. 9B, records of pitch numbers are preliminarily generated with default values of the state "1" and the state "2" all assuming "disabled", and the record information of the corresponding pitch number is updated every time the record is added to the above-mentioned pitch manager table.

Therefore, when the records of the pitch numbers 23–31 are added to the pitch manager table as new mounting schedules of the unit B as described above (refer to the symbol ☆ in FIG. 9A), the corresponding record information of the unit holder table is updated as shown by the symbol ☆ of FIG. 9B. In this case, the values of the state "2" for the records of the pitch numbers 23–31 in FIG. 9B are those shown after being changed from "disabled" to "enabled".

This is equivalent to the change of the holder class instances I_23–I_31 in the example of FIGS. 1A and 1B to include the information shown by the reference characters I_23'–I_31' in FIG. 1B.

Also, in the example of the unit table shown in FIG. 10, unit instances generated in the order of the serial number are registered as records.

For example, the records for the pitch numbers 23–31 shown by the symbol ☆ in FIG. 9A have the management ID of "9", so that the record with the serial number "9" shown by the symbol ☆ in the unit table of FIG. 10 is generated in association therewith. Therefore, it is seen that the unit B is scheduled for mounting on the mounting position with the pitch numbers 23–31 in the term from 2000/11/4 to 2000/11/15.

Thus, with the processing flow of mounting schedule of a new unit shown in FIG. 8, the pitch manager table T5_1*a*, the unit holder table T5_1*b*, and unit table T5_2 are updated as shown in FIGS. 9A, 9B, and FIG. 10.

It is to be noted that by replacing the pitch manager class 40, the unit holder class 30, and the unit class 31 shown in FIG. 8 with a slot manager class 60, a card holder class 50, and a card class 51 respectively related to cards, the processing flow of mounting schedule of new cards can be executed by a processing similar to that of FIG. 8.

In this case, a slot manager table T5_3*a* (not shown) for managing life-cycle information of the card holder instance, a card holder table T5_3*b* (not shown) for holding a record per slot number, and a card table T5_4 (not shown) having a card type, a card width, a slot starting position as parameters can be used as tables respectively corresponding to the pitch manager table T5_1*a*, the unit holder table T5_1*b*, and the unit table T5_2 in FIG. 8.

By preparing such a pitch manager table T5_1*a*, a unit holder table T5_1*b*, a unit table T5_2, a slot manager table T5_3*a*, a card holder table T5_3*b*, and a card table T5_4, it is made possible to display images of bays and units respectively on the screen of the center terminal 15 operated by the operator when inputting a new mounting schedule of the units and the cards as the graphical user interface as if actual bays and units are presented right in front of the operator.

Figure 11:
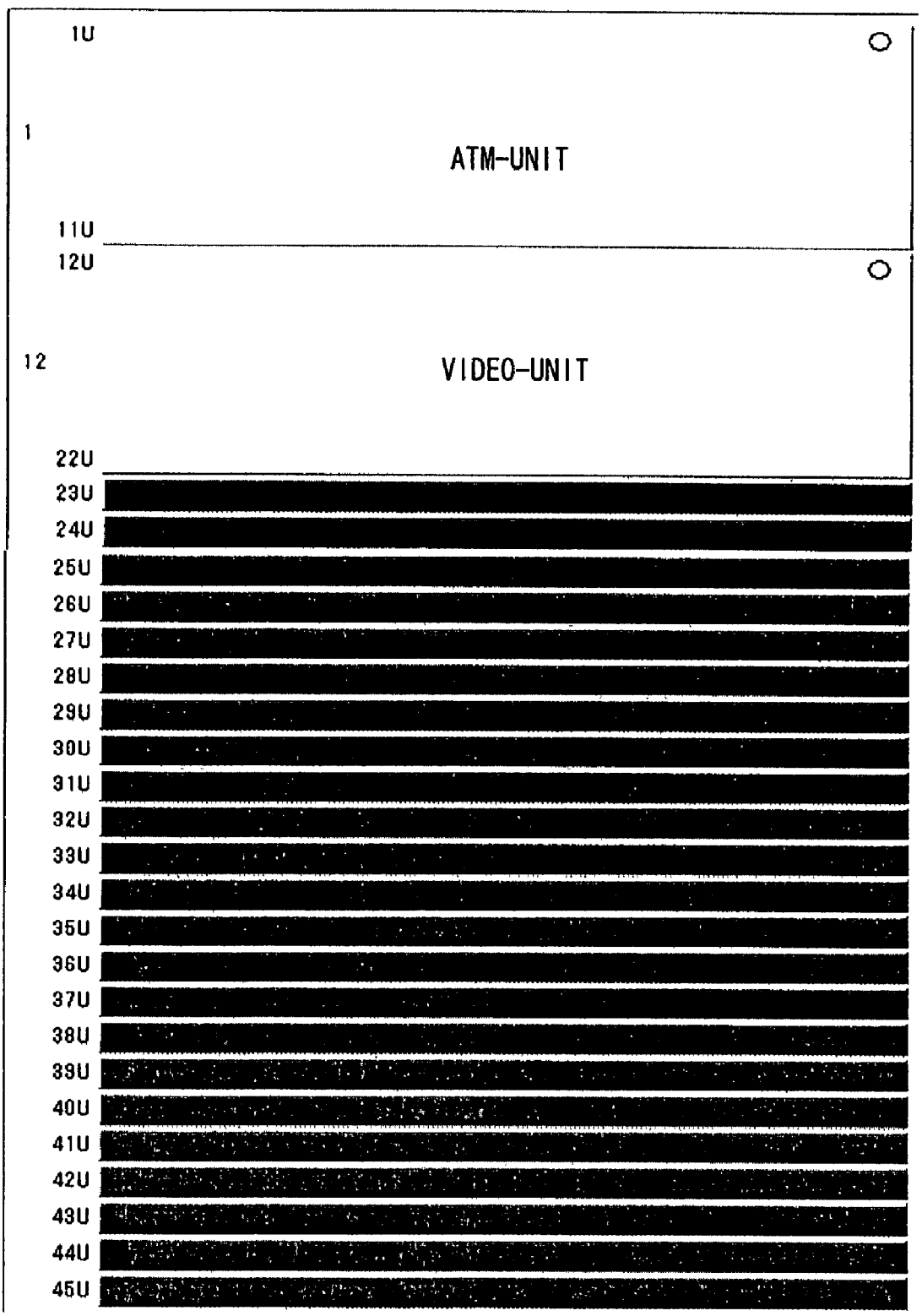
FIG. 11 is a screen layout diagram showing a screen image of a bay in an embodiment of the present invention.

FIG. 11 shows a screen image of a bay of such a graphical user interface, and shows the mounting state (including mounting schedule) of units on a bay for a designated term. In FIG. 11, in order to indicate that units are mounted or there are mounting schedules of units, the pitch numbers 1–11 (1U–11U in FIG. 11) and pitch numbers 12–22 (12U–22U in FIG. 11), the names of the units "ATM-UNIT" and "VIDEO-UNIT" are respectively indicated and the mounting positions of the other pitch numbers (23U–45U in FIG. 11) are shown as unused pitches.

Namely, in the designated term, it is possible to input the mounting schedule of a new unit on any position of the unused pitches displayed on the screen.

It is to be noted that upon "mounting a unit", the unit cannot be used by only placing the unit on a predetermined position, but a "setup" processing is required. Therefore, the states of having a mounting schedule of a unit and of having the setup processing completed are different from each other.

In the example shown, when the "ATM-UNIT" has been already set during the designated term, whereas the "VIDEO-UNIT" has the mounting schedule but is unset, the unit already set is indicated in yellow and the unset unit is indicated in gray, so that the operator can recognize whether or not the unit is set or unset on the screen by the difference of the color indication.

The operator can move to an input screen of the mounting schedule (not shown) by clicking a pointer on the screen at any of the unused pitch as a mounting start position of a new unit, so that the process shown in FIG. 8 will be executed by designating the unit kind.

Also, by designating the term of screen display from current time to some time in the future, the unit setup processing can also be executed immediately in addition to the mounting schedule input of the unit during the designated term.

Figure 12:
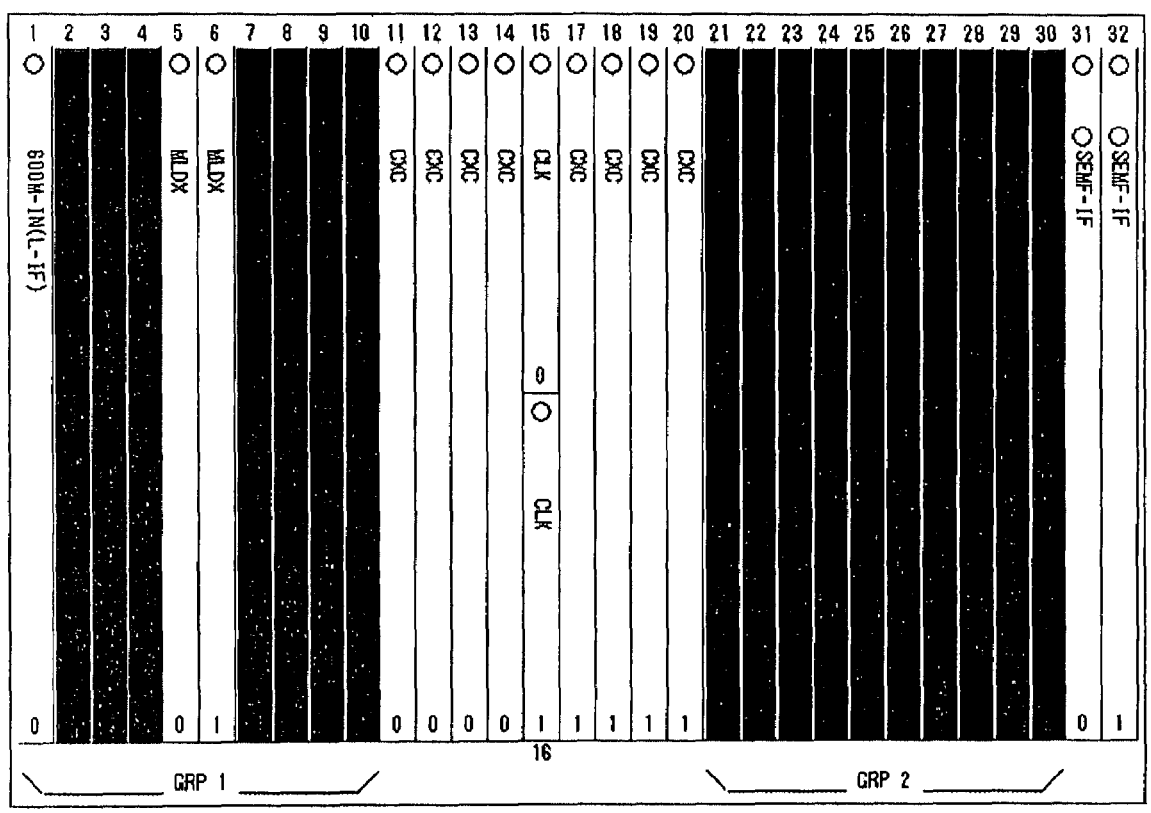
FIG. 12 is a screen layout diagram showing a screen image of a unit in an embodiment of the present invention.
Figure 13A:
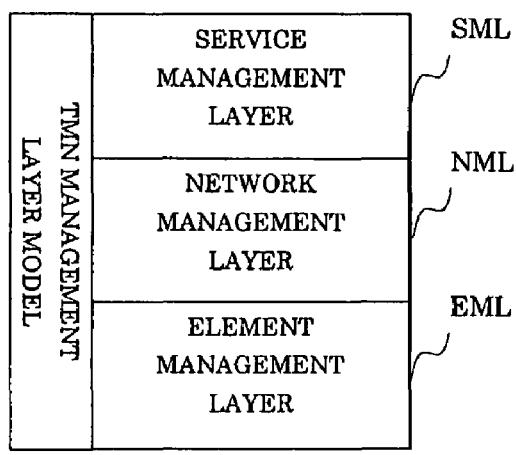
FIG. 13 is a diagram illustrating a general correspondence between network layers and network management system functions.
Figure 13B:
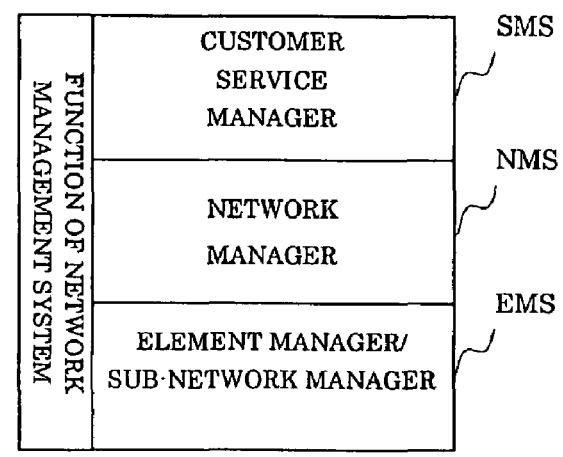

Also, FIG. 12 shows the screen image of the unit, where mounting states (including mounting schedule) of a card on a unit for a designated term is shown.

In FIG. 12, in order to show that cards are mounted (or mounting schedule of cards exist) on slot numbers 1, 5, 6, 11–20, 31, and 32, the names of the cards such as "600M-IN(L-IF)" and "MLDX" are shown, and other mounting positions of slot numbers 2–4, 7–8, and 21–30 are shown as unused slots.

It is to be noted that the slots 15 and 16 in FIG. 12 indicated in two rows represent the specific slot arrangement of the unit shown in FIG. 12.

In the designated term for showing FIG. 12, the mounting schedule of the new card can be inputted at any position of the unused slots displayed on the screen.

The operator can move to an input screen of the mounting schedule (not shown) by clicking a pointer on the screen at any of the unused slots designated as a mounting start position of a new card, so that the input process of the mounting schedule is initiated by designating the card type.

In the description of the above-mentioned embodiment, it has been described as if the units and the cards are the existing physical components. However, in the above-mentioned embodiment it is possible to reserve the mounting position of a scheduled future use by a virtual object without designating a specific unit or card.

In this case, a blank area class 32 (not shown) may be incorporated corresponding to the unit class 31 and the card class 51, and the scenario portion 100 may request the blank area class 32 instead of the unit class 31 to generate the blank area instance at step S6 in FIG. 8.

Also, it is possible to separately manage the unit instance and the blank area instance by using the blank area table (not shown), apart from the unit table T5_2.

As mentioned above, a network element management method, a network element management apparatus, and a network management system according to the present invention is arranged such that an external input mounting schedule for a physical component detachable from a network element as mounting plan information including a type of the physical component, a scheduled mounting position within the network element, and a scheduled mounting term is received through a graphical user interface, no overlap with a preliminarily provided mounting schedule for another physical component per each predetermined measure of the scheduled mounting position is confirmed based on the inputted mounting plan information, the mounting plan information is determined to be implementable only when all of the predetermined measures of the scheduled mounting position are confirmed, information of a holder class instance already generated in association with all of the predetermined measures of the scheduled mounting position is changed only when the mounting schedule is implementable, and a physical class instance associated with the holder class instance is generated. Therefore, a generation management of physical components on a network element with an efficient occupancy, and corresponding to the realities is made possible.

What we claim is:

1. A network element management method comprising:
   receiving an external input mounting schedule for a physical component detachable from a network element as mounting plan information including a type of the physical component, a scheduled mounting position within the network element, and a scheduled mounting term through a graphical user interface;
   confirming that there is no overlap with a preliminarily provided mounting schedule for another physical component per each predetermined measure of the scheduled mounting position based on the inputted mounting plan information, and determining that the mounting plan information is implementable only when all of the predetermined measures of the scheduled mounting position are confirmed;
   a first instance processing for changing information of a holder class instance already generated in association with all of the predetermined measures of the scheduled mounting position only when the mounting schedule is implementable; and
   a second instance processing for generating a physical class instance associated with the holder class instance.

2. The network element management method as claimed in claim 1 wherein when the physical component comprises a unit mountable on a bay of the network element, the holder class comprises a unit holder class for managing a pitch of the bay as the predetermined measure.

3. The network element management method as claimed in claim 1 wherein when the physical component comprises a card mountable on a unit, the holder class comprises a card holder class for managing a slot of the unit as the predetermined measure.

4. The network element management method as claimed in claim 1 wherein the predetermined measure is an expression of size of a virtual object that characterizes the physical component.

5. The network element management method as claimed in claim 4 further comprising a third instance processing for generating a blank area class instance associated with the virtual object.

6. A network element management apparatus comprising:
   a graphical user interface for receiving an external input mounting schedule for a physical component detachable from a network element as mounting plan information including a type of the physical component, a scheduled mounting position within the network element, and a scheduled mounting term;
   determination means for confirming that there is no overlap with a preliminarily provided mounting schedule for another physical component per each predetermined measure of the scheduled mounting position based on the inputted mounting plan information, and for determining that the mounting plan information is implementable only when all of the predetermined measures of the scheduled mounting position are confirmed;
   first instance processing means for changing information of a holder class instance already generated in association with all of the predetermined measures of the scheduled mounting position only when the mounting schedule is implementable; and
   second instance processing means for generating a physical class instance associated with the holder class instance.

7. The network element management apparatus as claimed in claim 6 wherein when the physical component comprises a unit mountable on a bay of the network element, the holder class comprises a unit holder class for managing a pitch of the bay as the predetermined measure.

8. The network element management apparatus as claimed in claim 6 wherein when the physical component comprises a card mountable on a unit, the holder class comprises a card holder class for managing a slot of the unit as the predetermined measure.

9. The network element management apparatus as claimed in claim 6 wherein the predetermined measure is an expression of size of a virtual object that characterizes the physical component.

10. The network element management method as claimed in claim 9 further comprising third instance processing means for generating a blank area class instance associated with the virtual object.

11. A network management system comprising:
    an element management server for managing network elements by utilizing the network element management method claimed in claim 1;
    a network management server for managing a network layer; and
    a service management server for managing a service for customers.

12. The network management system as claimed in claim 11 wherein the element management server performs setting required for mounting the physical component by using the holder class instance and the physical class instance according to the mounting schedule of the physical component.

13. A network management system comprising:
    an element management server for managing network elements by utilizing the network element management method claimed in claim 2;
    a network management server for managing a network layer; and
    a service management server for managing a service for customers.

14. The network management system as claimed in claim 13 wherein the element management server performs setting required for mounting the physical component by using the holder class instance and the physical class instance according to the mounting schedule of the physical component.

15. A network management system comprising:
    an element management server for managing network elements by utilizing the network element management method claimed in claim 3;
    a network management server for managing a network layer; and a service management server for managing a service for customers.

16. The network management system as claimed in claim 15 wherein the element management server performs setting required for mounting the physical component by using the holder class instance and the physical class instance according to the mounting schedule of the physical component.

17. A network management system comprising:

an element management server for managing network elements by utilizing a network element management method comprising receiving an external input mounting schedule for a physical component detachable from a network element as mounting plan information including a type of the physical component, a scheduled mounting position within to network element, and a scheduled mounting term through a graphical user interface; confirming that there is no overlap with a preliminarily provided mounting schedule for another physical component per each predetermined measure of the scheduled mounting position based on the inputted mounting plan information, and determining that the mounting plan information is implementable only when all of the predetermined measures of the scheduled mounting position are confirmed; a first instance processing for changing information of a holder class instance already generated in association with all of the predetermined measures of the scheduled mounting position only when the mounting schedule is implementable; and a second instance processing for generating a physical class instance associated with the holder class instance, wherein the predetermined measure is an expression of size of a virtual object that characterizes the physical component;

a network management server for managing a network layer; and a service management server for managing a service for customers.

18. The network management system as claimed in claim 17 wherein the element management server performs setting required for mounting the physical component by using the holder class instance and the physical class instance according to the mounting schedule of the physical component.

19. A network management system comprising:

an element management server for managing network elements by utilizing a network element management method comprising receiving an external input mounting schedule for a physical component detachable from a network element as mounting plan information including a type of the physical component, a scheduled mounting position within the network element, and a scheduled mounting term through a graphical user interface; confirming that there is no overlap with a preliminarily provided mounting schedule for another physical component per each predetermined measure of the scheduled mounting position based on the inputted mounted plan information, and determined that the mounting plan information is implementable only when all of the predetermined measures of the scheduled mounting position are confirmed; a first instance processing for changing information of a holder class instance already generated in association with all of the predetermined measures of the scheduled mounting position only when the mounting schedule is implementable; a second instance processing for generating a physical class instance associated with the holder class instance, and a third instance processing for generating a blank area class instance associated with the virtual object;

a network management server for managing a network layer; and a service management server for managing a service for customers.

20. The network management system as claimed in claim 19 wherein the element management server performs setting required for mounting the physical component by using the holder class instance and the physical class instance according to the mounting schedule of the physical component.

* * * * *